United States Patent [19]
Gershenson

[11] Patent Number: 5,039,410
[45] Date of Patent: Aug. 13, 1991

[54] FILTER APPARATUS HAVING A BAG WITH A GASKET

[75] Inventor: Moshe Gershenson, Mohegan Lake, N.Y.

[73] Assignee: GAF Chemicals Corporation, Wayne, N.J.

[21] Appl. No.: 502,714

[22] Filed: Apr. 2, 1990

[51] Int. Cl.⁵ .......................................... B01D 29/11
[52] U.S. Cl. ................................. 210/232; 210/445; 210/452; 210/470
[58] Field of Search .............. 210/232, 238, 470, 471, 210/480, 495, 445, 448, 451, 452; 29/426.6, 451; 55/361

[56] References Cited

U.S. PATENT DOCUMENTS

| | | | |
|---|---|---|---|
| 2,853,195 | 9/1958 | Malcolm | 210/471 |
| 3,716,181 | 2/1973 | Terzuoli | 55/361 |
| 3,780,871 | 12/1973 | Hicks et al. | 210/471 |
| 4,169,331 | 10/1979 | Baker | 210/238 |
| 4,225,437 | 9/1980 | Woodard | 210/470 |
| 4,481,117 | 11/1984 | Collins | 210/471 |
| 4,669,167 | 6/1987 | Asterlin | 29/426.6 |

Primary Examiner—Robert A. Dawson
Assistant Examiner—Nanda L. Millard
Attorney, Agent, or Firm—Richard T. Laughlin; Anthony Lagani, Jr.; Joshua J. Ward

[57] ABSTRACT

A filter apparatus having a bag filter subassembly for collecting contaminating material. The bag filter subassembly includes a bag filter having a top end portion and a gasket ring having a groove receiving the top end portion. The gasket ring is a molded article, composed of a polyurethane composition. The groove has opposite sidewalls with molded protrusions caused by recesses in the top end portion. The recesses can be microscopically small, depending upon the fabric of the filter bag.

3 Claims, 2 Drawing Sheets

FILTER APPARATUS HAVING A BAG WITH A GASKET

The invention relates to a filter apparatus having a bag with a gasket, and in particular the invention relates to a bag with an integral, resilient, molded gasket.

BACKGROUND OF THE INVENTION

The prior art filter apparatus having a bag with a resilient gasket is described in U.S. Pat. No. 4,460,468, issued July 17, 1984. Related patents include U.S. Pat. Nos.
3,771,664, issued Nov. 13, 1973,
4,133,769, issued Jan. 9, 1979,
4,204,966, issued May 27, 1980,
4,259,188, issued Mar. 31, 1981,
4,285,814, issued Aug. 25, 1981,
4,419,240, issued Dec. 6, 1983,
4,460,468, issued July 17, 1984,
4,490,253, issued Dec. 25, 1984, and
4,669,167, issued June 2, 1987.

The prior art filter apparatus having a bag with a resilient gasket includes a housing, a cover plate, and a bag filter subassembly. The bag filter subassembly has a filter bag and a rubber seal member. The seal member having a web portion and a peripheral head portion for forming a seal between the housing and the cover plate, the rubber seal being attached to the bag filter at its open end by an adhesive or heat seal.

One problem with the prior art filter apparatus is that a portion of the filter bag at its open end separates from the seal member thereby causing a leakage past the seal member.

SUMMARY OF THE INVENTION

According to the present invention, a filter apparatus is provided. The filter apparatus comprises an enclosure subassembly and a bag filter subassembly, the bag filter subassembly having a filter bag and a molded plastic gasket ring, the filter bag having a top end portion at its open end, the gasket ring having an annular groove receiving the bag top end portion, the groove having oppositely facing sidewalls, the sidewalls having protrusions engaging respective depressions in the bag top end portion.

By using groove sidewalls with molded protrusions which engage respective depressions in the bag top end portion, the shear strength of the connection of the bag filter to the gasket ring is increased thereby avoiding the separation of the filter bag and the gasket ring and the resulting leakage past the gasket ring.

The foregoing and other objects, features and advantages will be apparent from the following description of the preferred embodiment of the invention as illustrated in the accompanying drawings.

DESCRIPTION OF THE PREFERRED EMBODIMENT

Figure 1:
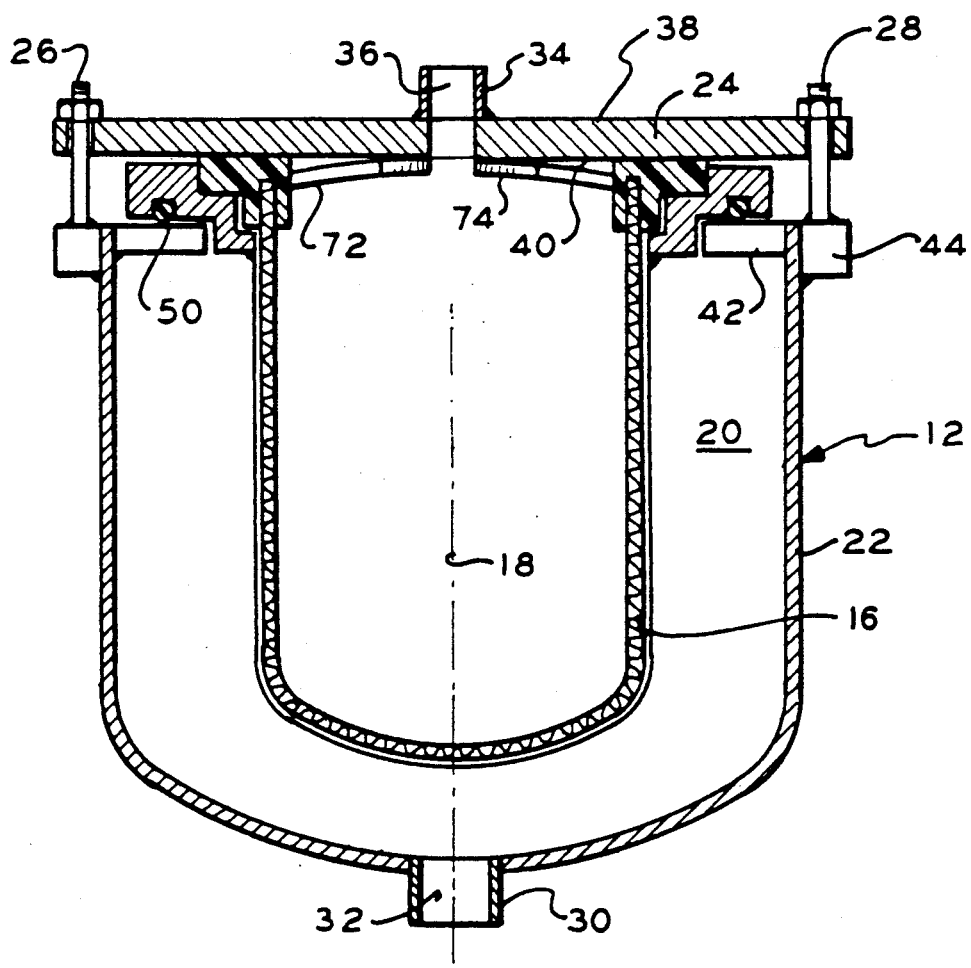
FIG. 1 is a vertical section view of a filter apparatus according to the invention.
Figure 2:
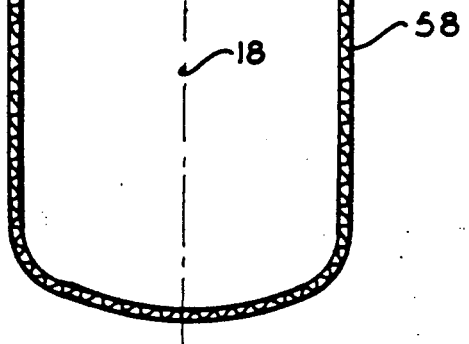
FIG. 2 is a portion of FIG. 1.
Figure 3:
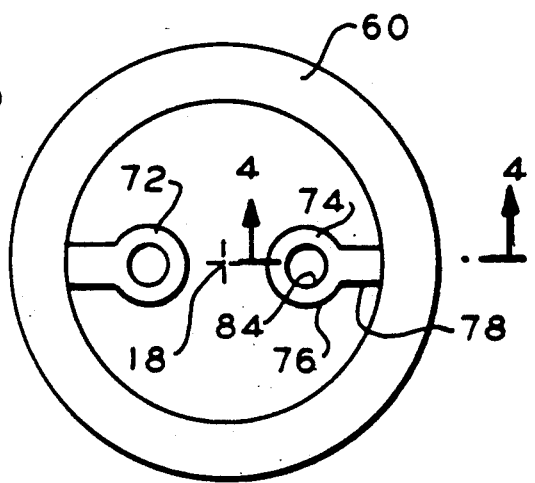
FIG. 3 is a plan section view as taken along the line 3—3 of FIG. 2.

As shown in FIGS. 1, 2, and 3 a pressure filtration apparatus 10 is provided. Apparatus 10 includes an enclosure subassembly 12, a basket subassembly 14, and a bag filter subassembly 16, which are coaxial about an axis 18. Enclosure subassembly 12 is a pressure vessel.

Enclosure subassembly 12, which encloses a chamber 20, has a housing 22, and a cover plate 24, which have a plurality of hold-down bolts 26,28 with nuts. Housing 22 also has an outlet pipe 30 and an outlet passage 32 from chamber 20. Cover plate 24 has an inlet pipe 34 and an inlet passage 36 to chamber 20. Cover plate 24 has an upper surface 38 and a lower surface 40.

Housing 22 also has an inner flange or support bracket 42, which supports basket subassembly 14, and has an outer flange 44, which supports bolts 26, 28.

Figure 4:
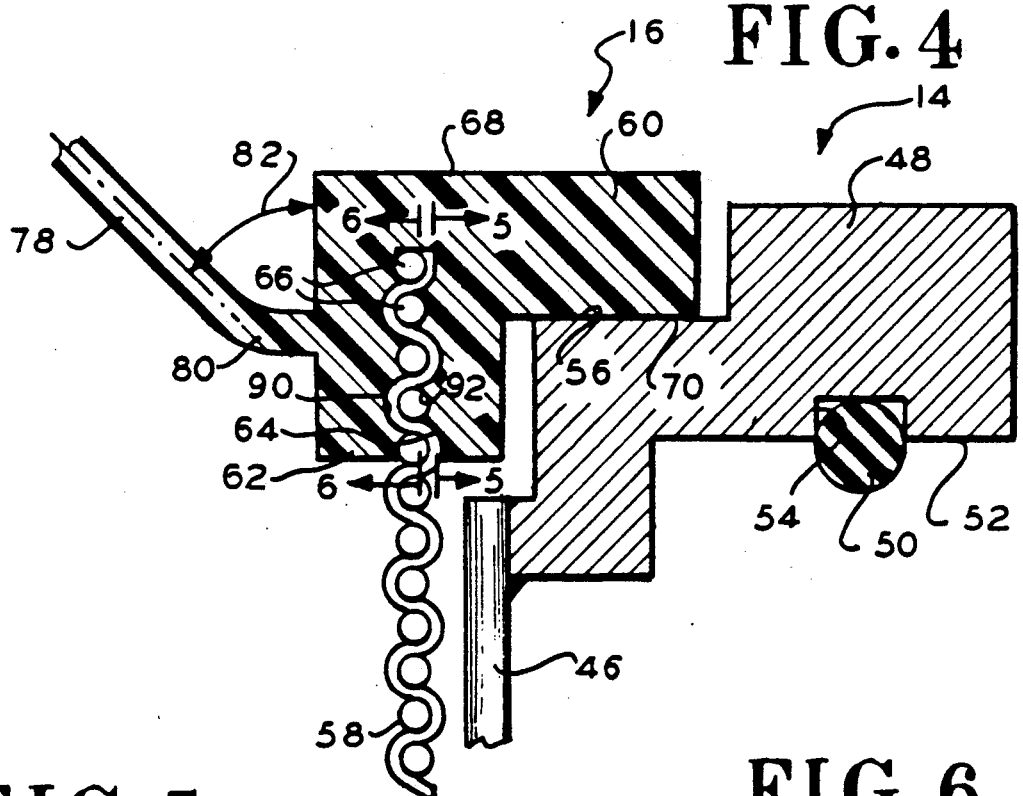
FIG. 4 is an enlarged view of a portion of FIG. 1.
Figure 5:
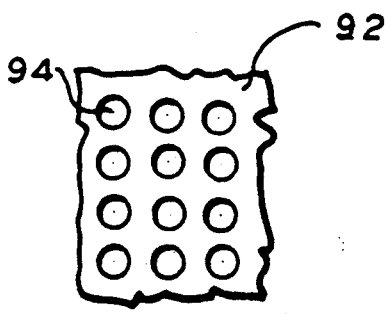
FIG. 5 is a section view as taken along the line 5—5 of FIG. 4.
Figure 6:
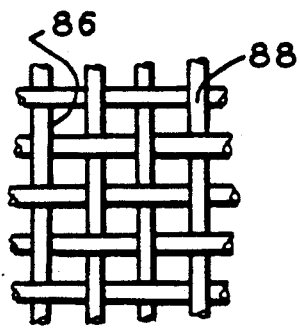
FIG. 6 is a section view as taken along the line 6—6 of FIG. 4.

As shown in FIG. 4, basket subassembly 14 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears on O-ring 50, which bears on inner flange 42.

Filter subassembly 16 has a filter bag 58 and an integral gasket ring 60. Gasket 60 is preferably made from an elastomeric aterial. Gasket ring 60 has a vertical portion 62, which has a ring-shaped groove 64 that receives a top end portion 66 of filter bag 58. Gasket ring 60 also has a top bearing surface 68, which bears against cover lower surface 40. Ring 60 has a bottom bearing surface 70, which bears annular upper bearing surface 56. Gasket ring 60 has a left handle 72 and an opposite right handle 74 for lifting bag 58 from chamber 20.

Right handle 74, which is identical to left handle 72, has a loop portion 76 and a stem portion 78. Stem 78 has an arcuate end portion 80, which is arcuate in section view as shown in FIG. 4. End portion 80 is fixedly connected and is integral with gasket ring 60 and is molded together with gasket ring 60.

Stem 78 is disposed at an angle 82 of preferably about 45 degrees to the vertical face of the gasket ring 60. Gasket ring 60 and handles 72, 74 are composed of a moldable resilient material, such as polyurethane composition. Loop 76 has an opening 84, which is a one finger opening. Loop 76 can be made wider as required, as for a two or three or four finger opening or grip.

Filter bag top end portion 66 has microscopically small recesses and depressions 86, which are disposed between microscopically small, criss-cross fibers or strands 88 such as a non-woven felted material or a woven fabric. Ring grove 64 has left and right, or radially inner and outer, oppositely facing sidewalls 90, 92.

Each sidewall 90 and 92 has spaced protrusions or bumps 94, which are recessed in respective depressions or recesses 86. The surface of sidewalls 90, 92 are relatively rough surfaces, which provide a shear resistance to a tension force in bag 58. The surfaces of sidewalls 90, 92 also adhere to the adjacent surfaces of end portion 66.

Filter subassembly 16 is made by placing liquid polyurethane in a mold, putting the bag top end portion, or the fabric filter medium, in the liquid, and then curing the liquid polyurethane or plastic.

Gasket ring 60 which is a molded ring made of a flexible material provides a near perfect seal between the bag 58 and the enclosure subassembly 12. Bypassing of unfiltered material between the filter bag 58 and the enclosure or vessel 12 is substantially eliminated.

Handles 72, 74, which in their relaxed state, protrude above the bag 58 and ring 60, facilitate the removal of the bag 58, when in a used contaminated condition. When the cover plate or lid 24 is closed, handles 72, 74 are pushed down into filter bag 58. When the cover plate 24 is reopened, handles 72, 74 pop up, above the opening of filter bag 58. Thus, the need to pull the handles 72, 74 out of the inside of filter bag 58 is eliminated. Also, twisting of gasket ring 60, when pulling handles 72, 74 is eliminated. Thus the loads on gasket ring 60 are substantially eliminated, so that there is no separation of sidewalls 90, 92 due to twisting of gasket ring 60, and so that there is no weakening of the connection of filter bag 58 to gasket ring 60.

The advantages of filter apparatus 10 with the molded gasket ring 60 are indicated hereafter:

A) Separation of filter bag 58 from gasket ring 60 is avoided, so that leakage past gasket ring 60 is substantially avoided.

B) The semi-rigid type of gasket ring 60 can easily fit or drop into its seat for ease of replacement.

C) The areas under the gasket ring 60, above the gasket ring 60, and around the O-ring 50, remain relatively clean, for better sealing and for easier replacement of the filter bag 58 and the gasket ring 60.

While the invention has been described in its preferred embodiment, it is to be understood that the words which have been used are words of description rather than limitation and that changes may be made within the purview of the appended claims without departing from the true scope and spirit of the invention in its broader aspects.

For example, gasket ring 60 can be composed of another, moldable, plastic material instead of the polyurethane composition.

What is claimed is:

1. A filter apparatus comprising:
   an enclosure subassembly having an axis and having a housing with a top flange and having a cover plate;
   a basket subassembly having a basket portion and having an annular ring with an underside surface with a seal groove with an O-ring in sealing engagement with the top flange;
   a bag filter subassembly having a filter bag and an integral resilient gasket ring having a bottom surface in sealing engagement with the annular ring and having a top surface in sealing engagement with the cover plate;
   the filter bag having a top end portion;
   the gasket ring having a groove which receives and is fixedly connected to the top end portion;
   the groove having opposite sidewalls having a plurality of spaced protrusions; and
   the top end portion having radially inner and outer surfaces with recesses receiving respective protrusions for transmitting a filter bag tension force to the gasket ring.

2. The apparatus of claim 1 wherein
   the gasket ring has at least one handle and a radially inner face;
   the handle having an arcuate flexible connection to the radially inner face;
   whereby an axial lifting force on handle is disposed parallel to and slightly offset from the filter bag tension force, for minimizing twisting of the gasket ring and for avoiding separation of the groove sidewalls.

3. The apparatus of claim 1, wherein the gasket ring is composed of a polyurethane composition.

* * * * *